Figure 4:
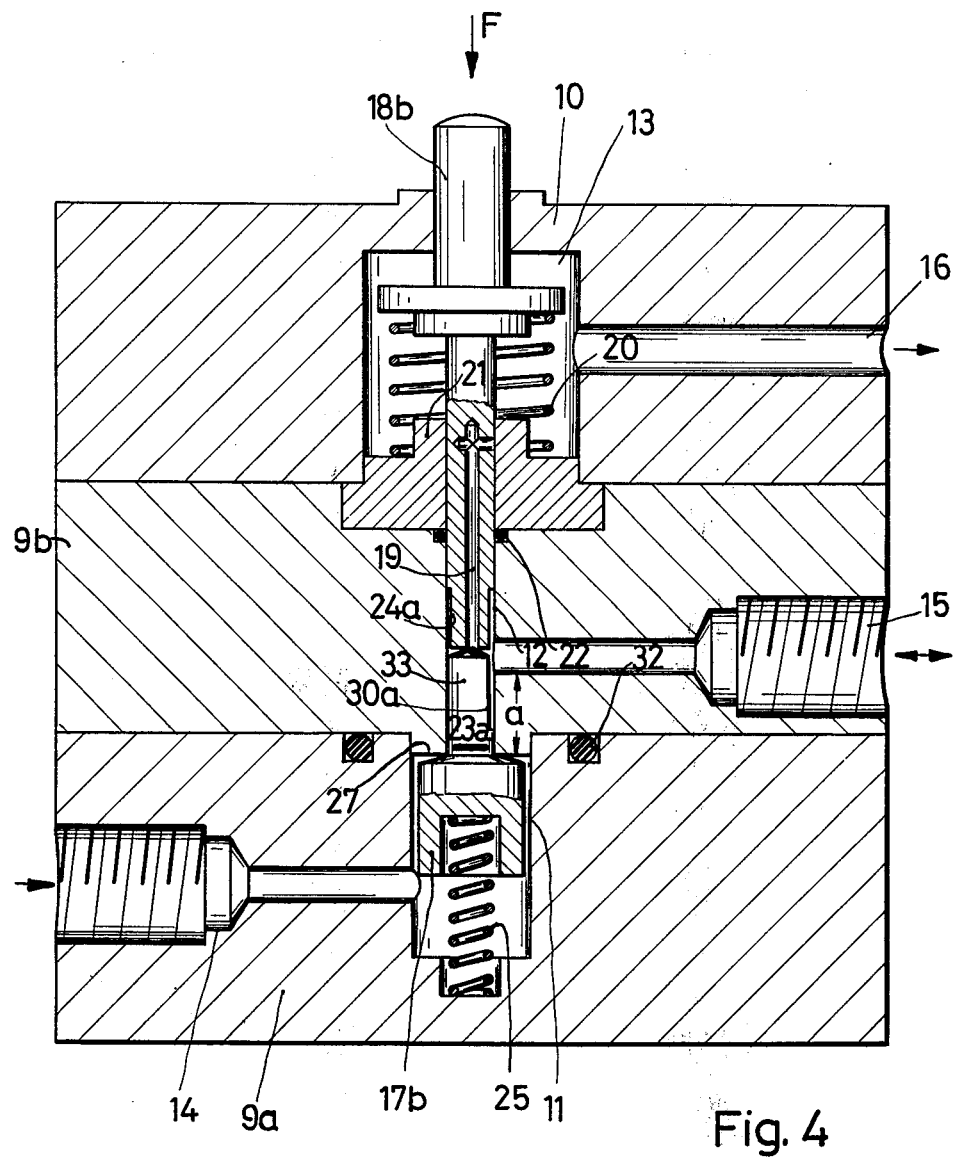

United States Patent [19]

Weisenberger

[11] 4,064,910
[45] Dec. 27, 1977

[54] FLUID CONTROL VALVE

[75] Inventor: Gottfried Weisenberger, Mainz, Germany

[73] Assignee: Effbe-Werk Fritz Brumme & Co. KG, Raunheim, Germany

[21] Appl. No.: 693,777

[22] Filed: June 8, 1976

[30] Foreign Application Priority Data

June 10, 1975 Germany .............. 2525763

[51] Int. Cl.² ........................... F16K 11/14
[52] U.S. Cl. ................... 137/627.5; 91/390; 267/113; 267/DIG. 1
[58] Field of Search ........ 91/390; 137/627.5; 248/400; 267/65 D, 113, 118, 126, DIG. 1

[56] References Cited

U.S. PATENT DOCUMENTS

| 1,279,087 | 9/1918 | Desmond | 137/627.5 |
| 3,006,657 | 10/1961 | Augustin | 137/627.5 X |
| 3,094,341 | 6/1963 | Alfieri | 137/627.5 |
| 3,837,361 | 9/1974 | Urban | 137/627.5 |

FOREIGN PATENT DOCUMENTS

| 1,064,357 | 8/1959 | Germany | 137/627.5 |
| 1,063,047 | 8/1959 | Germany | 137/627.5 |

Primary Examiner—Robert G. Nilson

[57] ABSTRACT

A control valve for controlling the supply of pressurized fluid to a working element, such as a pneumatic spring, comprises a housing having a bore comprising first and second bore sections with a smaller diameter middle bore section. A connection for a source of pressurized fluid communicates with the first bore section; an outlet opening with the second bore section; and a working element, such as a pneumatic spring, is fed from the middle bore section. A valve stem is slidable within the middle bore section in response to displacement of the working element, and has a duct therethrough which can interconnect the first and the second bore sections but which can be closed off by a closure member in the first bore section. The closure member can also isolate the middle bore section from the first bore section. The shape of the valve stem is such that for small deviations of the working element from a datum position, fluid flow from the first bore section into the middle bore section is throttled so that a slow return of the working element towards the datum is obtained, whereas the flow is unthrottled for larger deviations and a faster return is obtained.

8 Claims, 5 Drawing Figures

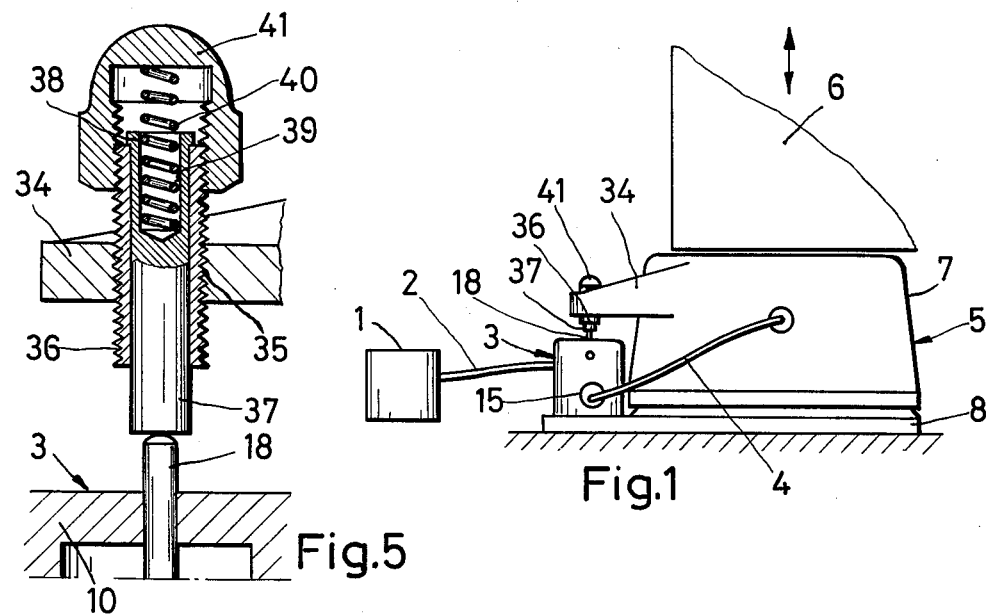
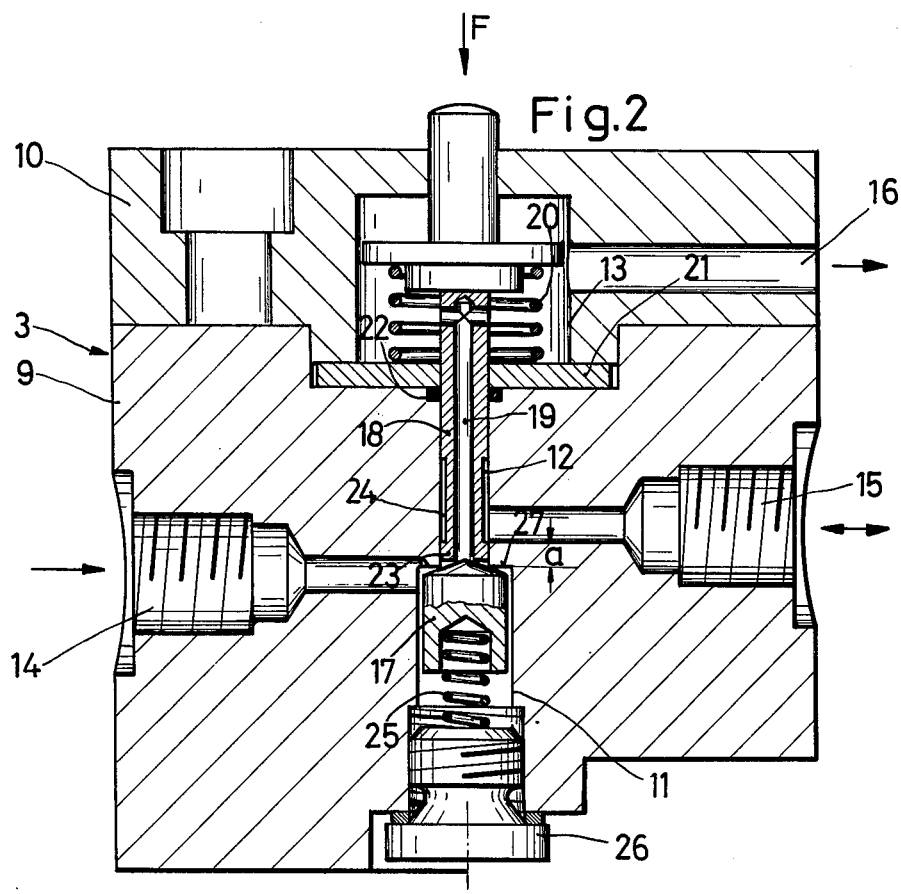

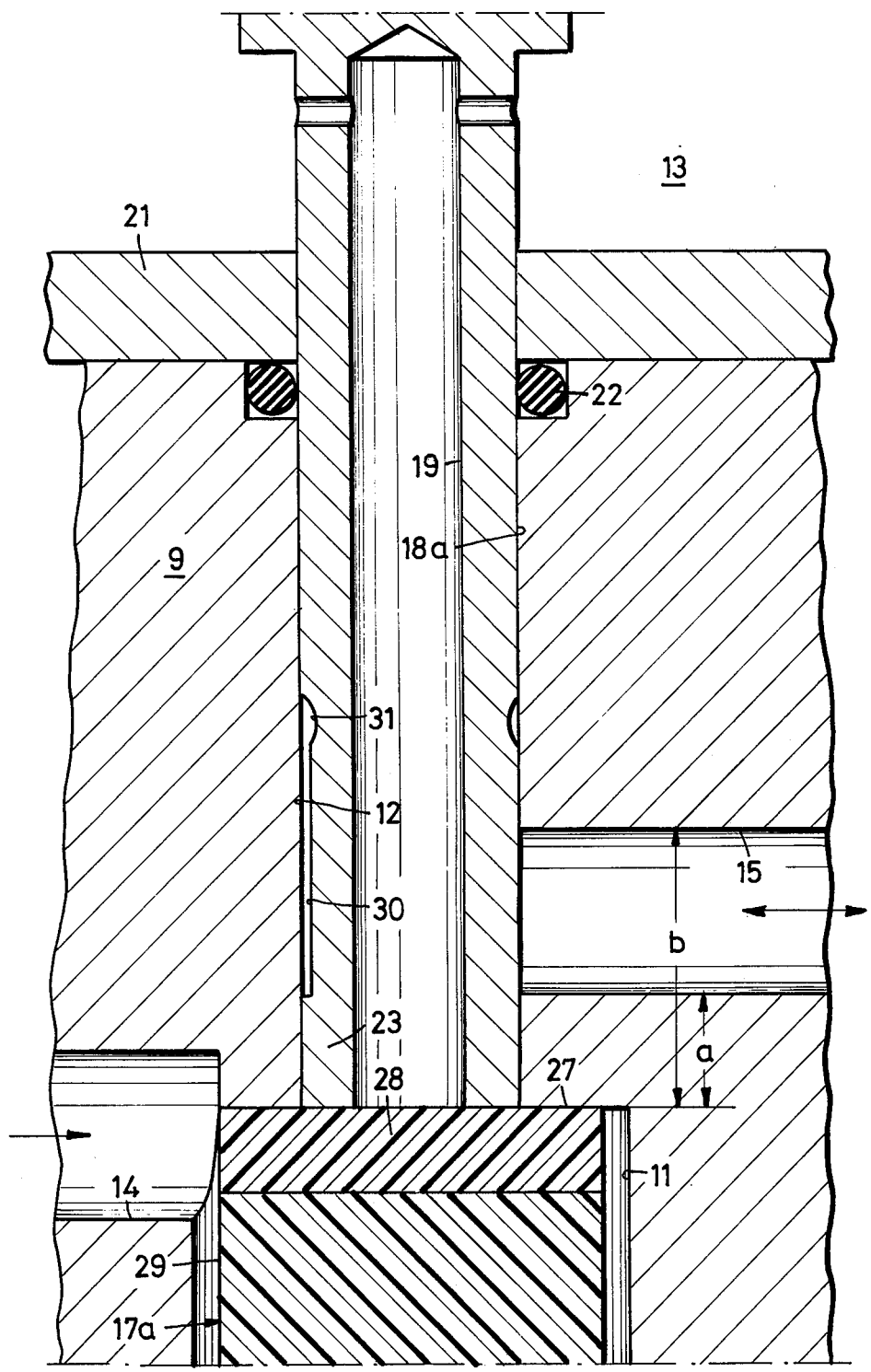

FLUID CONTROL VALVE

This invention relates to a fluid control valve, for use, for example, in controlling the supply of pressurised fluid to a working element.

Such a valve is of the kind comprising a housing having a bore which comprises first and second bore sections with a middle bore section of smaller diameter between them. The first bore section is connected to a coupling for a pressurised fluid source and the second to an outlet opening. The middle bore section is connected to a coupling for a working element, such as a pneumatic spring which is to be supplied with the pressurised fluid. The valve further comprises a valve stem sealingly guided in the middle bore section and slidable in dependence upon a controlled variable of the working element, one end of which valve stem has an opening communicating with the second bore section and with a duct passing through the valve stem which can be seated upon a valve seating surface of a closure member which is mounted in the first bore section. The closure member can slide towards the valve stem and towards a shoulder situated between the first and the middle bore sections, so that a passage for the pressurised fluid along the inner face of the middle bore section from the first bore section to the middle bore section is opened when the valve closure member moves away from the shoulder.

In a known control valve of this type, which provides positional control of a pneumatic spring loaded by a heavy mass such as a machine, the first bore section is in communication with a compressed air source via a fourth bore section, which has a larger diameter than the first bore section and includes a second closure member which is pressed by a spring against a shoulder of the first bore section. The valve stem acts upon the second closure member via the first closure member and a spring, so that the second closure member does not open until the first closure member has opened. Furthermore, the valve housing contains a second control valve which maintains the air pressure constant in the first bore section at a value below the pressure of the compressed air source. When a small positional deviation of the mass occurs, which is transmitted by the valve closure member, firstly the smaller air pressure in the first bore section is effective and then, for a larger positional deviation, the higher air pressure of the compressed air source acts, in a direction to reduce the deviation. For deviation in the opposite direction caused by relieving the weight of the mass from the valve stem, the valve stem moves in the opposite direction, away from the first closure member, so that the air escapes from the pneumatic spring, via the duct in the valve stem, via the second bore section and thence via the outlet into the open air. The duct contains a restrictor so that the air can escape only slowly.

The aim of the present invention is to provide a control valve of the type initially referred to, which makes possible, with reduced complication, a positional control which is at least equally accurate and rapid.

According to the invention, the passage includes a throttle which acts in dependence upon the position of the valve stem, which throttle is so constructed that it is operative for a small deviation of the controlled variable from a datum position, but when a large deviation occurs is inoperative. As long as the throttle is operative, i.e. for a small deviation, slow reduction of the deviation occurs, so that overswings are avoided. When, by contrast, a large deviation suddenly occurs, the throttle becomes almost immediately inoperative, so that the passage is substantially unthrottled and a rapid reduction of the deviation to a small deviation takes place. The throttle then again becomes operative to reduce the smaller deviation. In this method, the second valve closure member, and the additional pressure control valve, can be omitted.

In detail, provision can be made that the end of the valve stem adjacent to the valve closure member defines, together with the inner wall of the middle bore section, over a first axial range corresponding to the small control deviation, a smaller passage cross-section than in a second axial range adjacent thereto, and that the second axial range is longer than a distance, provided in the direction of displacement of the valve stem, between the connection provided for the working element and a shoulder situated between the first and the middle bore sections.

This constitutes an especially simple method of constructing a throttle which is operative in dependence upon the magnitude of the deviation. So long as the first axial range of the valve stem is situated partially or completely inside the middle bore section, the passage is throttled and therefore the throttle is operative. If, by contrast, the valve stem is displaced sufficiently far out of the middle bore section for the first axial range of the valve stem to be situated completely in the first bore section, then the second axial range of the valve stem determines the size of the passage cross-section and the passage is practically unthrottled.

Preferably, the external diameter of the valve stem over the first axial range is larger than that over the second axial range. This form of valve stem is easy to manufacture, on account of its rotational symmetry. The throttle is simply formed by a leakage clearance between the first axial range of larger diameter and the cylindrical inner wall of the middle bore section.

In another possible method of forming the valve stem, the stem over the first axial range is cylindrical and over the second is partially cylindrical with a circumferential flattening and an annular groove adjoining the circumferential flattening at the end thereof remote from the first axial range. Here again, the throttle is constituted by a leakage clearance between the middle bore section and the cylindrical part of the valve stem. Moreover, the pressurised fluid which penetrates between the bore wall and the cylindrical part on the side of the valve stem opposite to the flattened region, must follow a longer path along a throttled route until it reaches the flattened region and/or the annular groove or the working element connection. In this way, excessively large tolerances on the diameter, which could detract from the throttling action, are again compensated. It is possible to obtain a greater throttling effect without reducing the clearance between the inner face of the middle bore section and the valve stem, if, in order to ensure easy movement of the valve stem, this clearance cannot be still further reduced. On the other hand, the cylindrical axial part of the valve stem also does not need to be lengthened to regulate the throttle action, such lengthening would necessitate a possibly undesirable increase in the travel of the working element which would have to take place before the higher adjustment force would come into operation.

It is especially advantageous if the valve seat surface of the valve closure member is always separated, in the direction of displacement of the valve stem, from the connection provided for the working element, and if the duct passing through the valve stem is longer than the middle section of the bore in the housing. The throttle then acts for both positive and negative deviations, because when a small deviation occurs in the direction of unloading of the working element, the pressurised fluid flowing out of this element must flow via the throttle between the working element connection and the valve seating surface into the valve stem duct. No throttle is therefore necesssary in this duct.

Furthermore, the valve seating surfaces of the valve closure member, against which the shoulder and the valve stem bear, can be constructed to lead directly one into the other. This simplifies the production of the valve closure member.

It is however also possible for the valve closure member to include a plug guided in the middle bore section, the end face of which plug constitutes the valve seating surface for the valve stem, and the axial part of which adjacent to the part guided in the first bore section defines, together with the inner wall of the middle bore section, over a length corresponding to the smaller deviation in one direction, a smaller passage cross-section than in the second axial range adjacent thereto. Here, the valve closure member is additionally guided in the middle bore section by the plug. The frictional wear in the region constituting the throttle is less, since for a deviation in one direction there is no relative movement in this region.

The cylindrical plug can include a flattened region extending over the axial length of the second part. The surface of the plug bounding the throttle cross-section is completely cylindrical and therefore easy to manufacture. The desired throttling action can be attained by suitable dimensioning of the clearance between the middle bore section and the completely cylindrical surface of the plug. The flattening can also be performed in a simple manner. On account of the longer path to the working element connection, for the pressurised fluid outside the range of the flattened portion, an increase in the throttling action is obtained, without reducing the clearance between the inner face of the middle bore section and the valve stem. This ensures easy movement of the valve stem, and without lengthening the fully cylindrical part of the plug, which would require a possibly undesirable increase in the travel of the working element, accompanied by a throttled and therefore reduced adjustment force of the control valve which would result in the later coming into operation of the high adjustment force.

Provision can furthermore be made that a first part of the cylindrical valve stem adjacent to the plug has a smaller external diameter than the portion of the valve stem adjacent to this first part, and that the sum of the axial lengths of the second plug part and the first valve stem part is greater than a distance, provided in the longitudinal direction of the middle bore section, between the connection provided for the working element and the shoulder situated between the first and the middle bore sections. This rotationally-symmetrical, axially-stepped shape of the valve stem is not only simple to manufacture, but also ensures that, even when displacement of the valve stem beyond the inner mouth of the working element connection occurs, the greater passage cross-section, and thus the higher adjustment force, for reducing the large deviation is available.

It is furthermore advantageous if the duct passing through the valve stem is shorter than the middle bore section. In this way, the mouth of the duct, for small deviations, is still situated inside the middle bore section, so that the pressurised fluid issuing from the mouth of the duct can only pass through the clearance between the valve stem and the inner face of the middle bore section into the second bore section, and is throttled inside this clearance. The pressurised fluid is therefore throttled by the one throttle for a small positive deviation and by the other throttle for a small negative deviation. There is therefore a facility for choosing the use of the higher adjustment force in dependence upon the algebraic sign of the deviation. The restoring force of the working element, which determines the flow rate of the pressurised fluid to the outlet opening, can be different depending upon the design of the working element. Suitable individual design of the two throttles makes possible the achieving of an optimum adjustment speed as a function of the adjustment direction and the adjustment forces available i.e. the pressure of the pressurised fluid and the restoring force of the working element.

The valve closure member is preferably spring-loaded. Assurance is thus provided that the valve closure member, in any position of the control valve, is biased to adopt the closure position independently of the pressure of the pressurised fluid.

This valve closure member may be of an elastic material, such as natural rubber or plastics. An elastic material increases the sealing valve seating surface by an amount corresponding to the depth of penetration of the parts which bear against the valve seating surface, so that valve leakage is prevented with a high degree of certainty, and control accuracy is improved.

The valve closure member can be at least as long, in the direction of displacement, as the first bore section. The valve closure member then bears against both ends of the first bore section so that, due to the elasticity of the valve closure member, an additional closure spring is unnecessary.

It is furthermore advantageous if a portion of the valve closure member comprising the valve seating surface is of a harder material than the remaining part of the valve closure member. The harder material makes possible a reduction in hysteresis resulting from the elasticity of the valve closure member, i.e. a delay in the opening or closure operation by comparison with the adjustment movement of the valve stem, without the spring characteristic of the remaining part of the valve closure member being influenced.

Provision is preferably made for the end of the valve stem remote from the valve closure member to bear, under the action of a spring, against an abutment adjustably attached to the working element. The controlled variable is transmitted to the valve stem by this abutment. The adjusted position of the abutment thus determines the datum position of the working element. Since there is no rigid connection between the valve stem and the abutment, an excessive deviation, falling outside the control range of the control valve, and acting in the direction of an outward displacement of the valve stem, does not lead to overloading of the strength of the control valve even if very high forces cause an excessively large positional change of the working element in this direction.

The abutment can be subject to spring biasing to limit the control range in the one direction. The bias ensures that, when a deviation in one direction, that is in the direction of inward displacement of the valve stem, occurs, a change in position of the working element is transmitted rigidly, and therefore unchanged, to the valve stem. However, as soon as the spring bias is exceeded, the effect of the spring is that the control deviation is no longer transmitted to its full value. In this way, overloading of the control valve in the opposite direction, i.e. for inward movement of the valve stem, is also avoided.

The working element can comprise a rigid member with a threaded passage into which a tube having an external thread is screwed, a pin acting as the abutment being guided in this tube under the action of the spring bias. With this embodiment, it is possible by simply turning the tube, to effect a change in position of the abutment and thus a change in the positional datum of the working element.

In a further embodiment, provision can be made for a lock-nut to be screwed on to that end of the tube which projects from the rigid member on the side remote from the control valve, and for the pre-compressed spring to be inserted between the pin in this tube and the inner end surface of the lock-nut. An adjustment of the spring precompression can be effected by this lock-nut.

Embodiments of the invention will now be described, by way of example, with reference to the accompanying drawings, in which:

FIG. 1 is a diagrammatic view of a machine support arrangement including a control valve in accordance with the invention for controlling fluid to a working element in the form of a pneumatic spring for the vibration-insulated and impact-insulated support of a machine, FIG. 2 shows a cross-section of a first form of control valve, FIG. 3 shows, on an enlarged scale, a cross-section of part of a second form of control valve, FIG. 4 shows a cross-section of a third form of control valve, and FIG. 5 shows a partial cross-section, on enlarged scale, of the coupling between the working element and the control valve of FIG. 1.

Referring to FIG. 1, a source 1 of pressurised fluid supplies a working element in the form of a pneumatic spring 5, via a line 2, a control valve 3 and a line 4. The pneumatic spring is disposed, instead of steel or rubber springs, between a machine 6 and the foundation, for the vibration-insulated and impact-insulated support of the machine. The upper part 7 of the spring is displaceable relative to its lower part 8 as a function of both the air pressure transmitted through the control valve 3 and the weight of the machine 6. The control valve 3 ensures, by action on the pneumatic spring 5 (usually operating in parallel with a number of other control valves and pneumatic springs) the positional regulation of the pneumatic spring 5 and thus of the machine 6, in such a way that the mean elevation of the oscillating machine 6 corresponds to a datum.

The control valve 3 shown in FIG. 2 has a housing which comprises housing parts 9 and 10 connected together by screws. A housing bore comprises a first bore section 11, a middle bore section 12 of smaller diameter and a second bore section 13 of larger diameter. A connection 14 for the compressed air source 1 communicates with the bore section 11. The middle bore section 12 is provided with the connection 15 for the working element 5. An outlet opening 16 leads from the bore section 13 into the atmosphere. A valve closure member 17, which may be of metal but is preferably of elastic material, is axially slidably guided in the bore section 11. A cylindrical valve stem 18 is axially slidably guided in the middle bore section 12. The valve stem 18 has an axial duct 19, which opens into the bore section 13. A spring 20, which bears at one end against a flange of the valve stem 18 and at the other end against a securing ring 21, tends to urge the valve stem 18 upwards against a positional change of the upper part 7 of the working element 5 acting in the direction of the arrow F. An O-ring 22 seals the valve stem 18 in the middle bore section 12. An axial section 23 of the valve stem 18 adjacent to the valve closure member 17 has a larger diameter than an axial section 24 adjacent to it. The axial section 24 of smaller diameter of the valve stem 18 is longer than the distance $a$ between the connection 15 and the bore section 11. The valve closure member 17 has a slightly conical end surface and is pressed against a shoulder 27 and the lower end of the valve stem 18 by a spring 25, which bears against a closure screw 26. Due to the conical shape of the end face of the valve closure member 17, this face bears substantially only against the edge of the shoulder 27 and the inlet opening of the duct 19. The valve seating surfaces on the end face of the valve closure member 17 are therefore substantially circular lines, the radial width of which increases according to the depth of penetration of the bearing edges when elastic material is used for the valve closure member 17.

When a positional change of the working element 5 or of the machine 6 occurs in the direction of the arrow F, the valve stem 18 and the valve closure member 17 are pressed inwards, so that the valve closure member 17 loses contact with the shoulder 27. The air flowing from the compressed air source 1, via the connection 14 and into the bore section 11, then penetrates through the clearance between the part 23 of the valve stem 18 and the middle bore section 12 to the connection 15, and from there via the line 4 (FIG. 1) into the pneumatic spring 5. As a result of the increased pressure in the pneumatic spring 5, the upper part 7 is raised and the valve stem 18 is relieved of load, so that this stem is pushed back by the spring 20 sufficiently far for the valve closure member 17 again to bear against the shoulder 27 and again to block the passage between the part 23 and the middle bore section 12. This passage, because of the small clearance between the part 23 and the bore section 12, acts as a throttle, so that the restoring of the pneumatic spring, and thus of the machine 6, takes place with a relatively small force. If, however, a larger displacement of the machine 6 in the direction of the arrow F takes place to such an extent that the valve stem 18 is displaced inwards sufficiently far for the part 24 of smaller diameter to bridge across the distance $a$, then such a large cross-section passage is available between the valve stem part 24 and the inner face of the bore section 12 over the length $a$, that the air can flow practically unthrottled from the compressed air source 1, via the valve 3, into the pneumatic spring 5 and restores the pneumatic spring initially very rapidly into position. Only when the passage is again throttled by the part 23, does the more slow reduction of the deviation again commence.

A similar action takes place when a deviation occurs opposite to the direction of the arrow F. The valve stem 18 now lifts off the valve closure member 17, so that the air can flow out of the pneumatic spring 5, via the clearance between the valve stem 18 and the bore section 12, via the duct 19, the bore section 13 and the outlet opening 16. This return flow initially takes place via the throttle between the part 23 and the bore section 12. Only when a larger deviation occurs in the opposite direction to the arrow F is the valve stem 18 lifted so far that the part 23 of larger diameter lies above the lower edge of the mouth of the connection 15 in the bore section 12, so that the return flow of air out of the pneumatic spring 5 takes place practically unthrottled and thus the restoration towards the datum position takes place very rapidly until a smaller deviation is reached. The reduction of the remaining smaller deviation then again takes place somewhat more slowly, due to the throttled return flow, and the smaller restoring force resulting therefrom.

This means that a large positive or negative positional deviation is reduced at a higher speed than a small positional deviation, so that even when large positional deviations occur, only a short adjustment time is necessary. Also, for positional adjustment of working elements which do not act as shock absorbers the result of the stepwise reduction in the restoring force is that overswings beyond the adjusted datum point are largely prevented. The throttle acts equally well for positive and negative deviations.

In the embodiment of FIG. 3, shown partially to a larger scale, a valve closure member 17a is constructed in two parts. An upper part 28 consists of a harder elastic material than the lower part 29. Furthermore, the end face of the upper part 28 is flat. The valve seating surfaces are therefore larger than in the embodiment shown in FIG. 2, so that more certain closure of the valve is ensured. The somewhat harder material of the upper part 28 ensures that the shoulder 27 and the lower part of the valve stem 18a do not penetrate too far into the material of the valve closure member 17a. By this arrangement delay or hysteresis in the closing and opening of the valve is largely avoided. The elastic valve closure member 17a fully occupies the length of the bore section 11, so that an additional spring, such as the spring 25 used in the FIG. 2 embodiment, can be omitted. The spring force pressing the valve closure member 17a against the shoulder 27 is determined principally by the spring force of the lower part 29, which can be selected independently of the upper part 28. The parts 28 and 29 can be bonded together.

The valve stem 18a has, in the part adjacent to the axial part 23 of larger diameter, a flattened region 30 on the side of its circumference remote from the connection 15. The region 30 terminates in an annular groove 31. The axial length of the region 30 is less than a distance b between the upper edge of the connection 15 and the shoulder 27, so that the lower edge of the annular groove 31 has already passed beyond the upper edge of the connection 15 when the upper edge of the part 23 has just passed the shoulder 27 during downward movement of the valve stem 18a. The annular groove 31 ensures a flow from the region 30 to the connection 15 in the position of the valve stem 18a illustrated on the right hand side of FIG. 3, independently of the angular position of the stem.

The operation of the control valve of FIG. 3 is in principle the same as that of control valve 3 shown in FIG. 2. As soon as the upper edge of the part 23 has passed below the shoulder 27, the throttle becomes inoperative, since air can now flow practically unimpeded through the space bounded by the inner face of the bore section 12 on the one hand, and the region 30 and the annular groove 31 on the other hand. By contrast, the throttling action of the passage between the middle bore section 12 and the valve stem 18a is greater in FIG. 3 for the same values of axial length and diameter of the part 23 and diameter of the bore section 12 as in FIG. 2. This is because the air flow in the clearance between the bore section 12 and the valve stem 18a, for example in the position of the valve stem 18a illustrated on the left hand side of FIG. 3, is additionally throttled along the path from the bore section 11 to the connection 15, also at the level of the circumferential region of the valve stem 18a between the region 30 and the connection 15. By this arrangement, the throttling action can consequently be increased without increasing the control ranges in which the throttle is operative or inoperative, and without the clearance between the bore section 12 and the valve stem 18a needing to be reduced at the expense of increased friction between them.

In the embodiment shown in FIG. 4, the lower housing component is sub-divided into two parts 9a and 9b, sealed to each other by an O-ring 32. In this case the closure screw 26 of FIG. 2 is omitted. The valve closure member 17b has a plug 33 extending into the middle bore section 12. This plug 33 has a completely cylindrical axial part 23a, followed by a flattened region 30a. The lower part of the valve stem 18b comprises an axial part 24a of smaller diameter than the remaining part of the valve stem. In the closed position of the valve, the duct 19 does not lead into the bore section 13, as in FIG. 2, but into the bore section 12, while the lower end of the duct 19 is closed by a conical end face of the plug 33, and the lower end of the bore section 12 is closed by a conical shoulder surface of the valve closure member 17b, which bears against the shoulder 27. The sum of the axial lengths of the part of the plug 33 comprising the region 30a and of the smaller diameter part 24a of the valve stem 18b is also greater than the distance a.

In this control valve, the part 23a and the cylindrical part of the plug circumference adjacent thereto, together with the inner face of the bore section 12, again act as a throttle, provided that the part 23a is situated inside the bore section 12 and the valve closure member 17b is lifted off the shoulder 27. For a control deviation of opposite algebraic sign, the valve closure member 17b bears against the shoulder 27, but the valve stem 18b is lifted off the plug 33 in a direction opposite to the arrow F and the radial outlet of the duct 19 is still situated inside the bore section 12 in contact with the inner face of the bore section 12 in the securing ring 21. The clearance between the inner face of the bore section 12 and the valve stem region above the radial outlet of the duct 19 then acts as a second throttle, as long as the deviation does not exceed a value at which the duct 19 opens directly into the bore section 13. In this arrangement there is the facility for selecting the throttling action for deviations of positive algebraic sign differently from that for deviations of negative algebraic sign, in order to make possible, for example, adaptation of the control speeds in one or the other direction to differing opposing forces.

As shown in FIG. 5, a rigidly cantilevered arm 34 of the upper part 7 of the pneumatic spring 5 has a threaded aperture 35 into which a tube 36 having an external thread is screwed. A pin 37 is axially slidably journalled in the tube 36. The pin 37 is longer than the tube 36 and has, at its upper end, a flange 38 and an axial bore 39. A spring 40 is inserted into the bore 39, the spring being maintained under compression by a locknut 41 screwed on to the tube 36. The spring 40 is compressed to an extent such that the pin 37, resting upon the outer end of the valve stem 18, retains its normal position in which the flange 38 bears against the end of the tube 36 throughout the normal travel of the upper part 7 of the pneumatic spring 5 until the pin 37 abuts against the upper part 10 of the valve housing. It is not until a larger deflection of the upper part 7 of the spring and the arm 34, relative to the lower part 8, exceeding the distance for the pin 37 to abut against the upper part 10 of the valve housing, has occurred, that the compression of the spring 40 is overcome. The spring 40 therefore protects the housing of the control valve 3 from more intense impacts of the oscillating machine 6, or additionally damps them. By turning the tube 36 in the threaded aperture 35, it is possible for the datum position of the upper part 7 of the spring and of the machine 6, relative to the lower part 8 of the spring, to be adjusted.

Departures from the embodiment examples illustrated lie within the scope of the invention. For example, the valve stem can also be used as a force sensor for measuring a force or a pressure to be regulated by the control valve and the working element.

I claim:

1. A control system for controlling the supply of pressurized fluid to a working element, such as a pneumatic spring, which valve comprises a housing having a bore comprising first and second bore sections with a middle bore section of smaller diameter between the first and second sections; a first passage in the housing for connection to a source of said pressurized fluid and communicating with said first bore section; an outlet opening in the housing and communicating with said second bore section; a second passage in the housing for connection to said working element and communicating with said middle bore section; a valve stem sealingly guided in said middle bore section and displaceable in accordance with a controlled variable of said working element, the valve stem having a duct therethrough communicating at one end with said second bore section; a valve closure member which is slidably guided in said first bore section towards the said valve stem and towards a shoulder at the boundary between said first and middle bore sections, the closure member having seating means for closure of said duct in said valve stem and for seating against said shoulder; the said seating means of said closure member being movable away from said shoulder to open a path for conduction of the pressurized fluid from said first to said middle bore section along the surface of said middle bore section; a throttle in said conduction path, which throttle is operative in dependence upon the position of the valve stem, the throttle being operative for a small deviation of said controlled variable from a datum, but being inoperative for a large deviation, the end of said valve stem remote from said valve closure member being urged by spring pressure against an abutment which is adjustably attached to said working element; and said abutment being subject to a spring pressure which limits the control range in one direction.

2. A system according to claim 1, including a said working element comprising a rigid arm with a threaded aperture into which a tube having an external thread is screwed, a pin being guided in the tube, under the spring pressure, to act as the abutment.

3. A system according to claim 2, wherein a lock nut is screwed on to that end of the tube projecting from the arm which is situated on the side of the arm remote from the control valve; and wherein a prestressed spring is located between the pin and the inner end face of the lock nut.

4. A control system according to claim 1 wherein said valve stem has a first axially-extending zone at its end adjacent said valve closure member, and a second axially-extending zone adjacent said first zone; wherein said first zone defines, with said surface of said middle bore section, a smaller conduction path cross section than does said second zone; and wherein said second zone is longer than a distance, in the direction of movement of the valve stem between said second passage and said shoulder.

5. A control system according to claim 4 wherein the external diameter of said first zone is greater than that of said second zone.

6. A control system according to claim 1 wherein the seating means of said valve closure member is, in all positions, spaced, in the direction of travel of the valve stem, from said second passage, and said duct through the valve stem is longer than said middle bore section.

7. A control system according to claim 1 wherein the seating means of the valve closure member against which said bore and said valve stem seat, lead directly one into the other.

8. A control system according to claim 1 wherein said valve closure member is spring-loaded towards said shoulder.

* * * * *